UNITED STATES PATENT OFFICE.

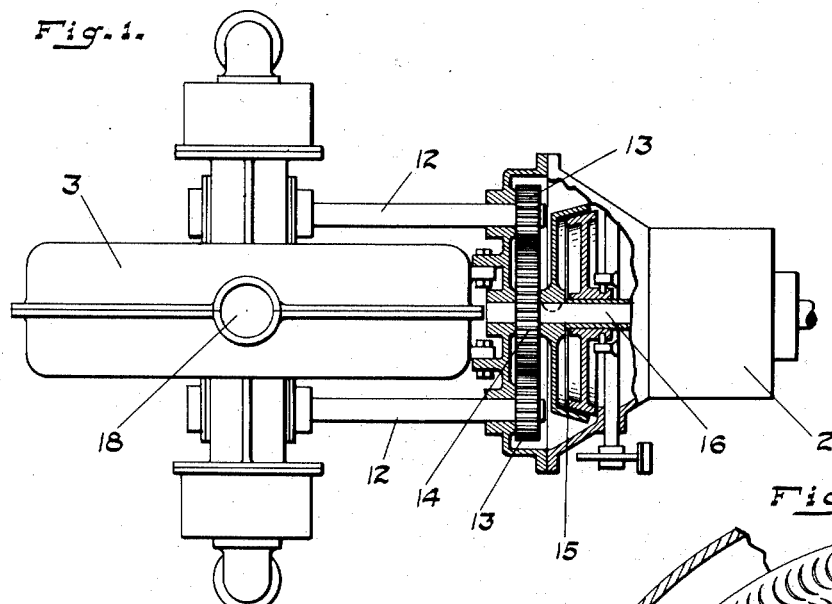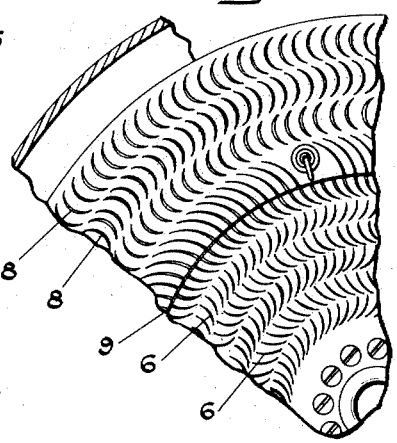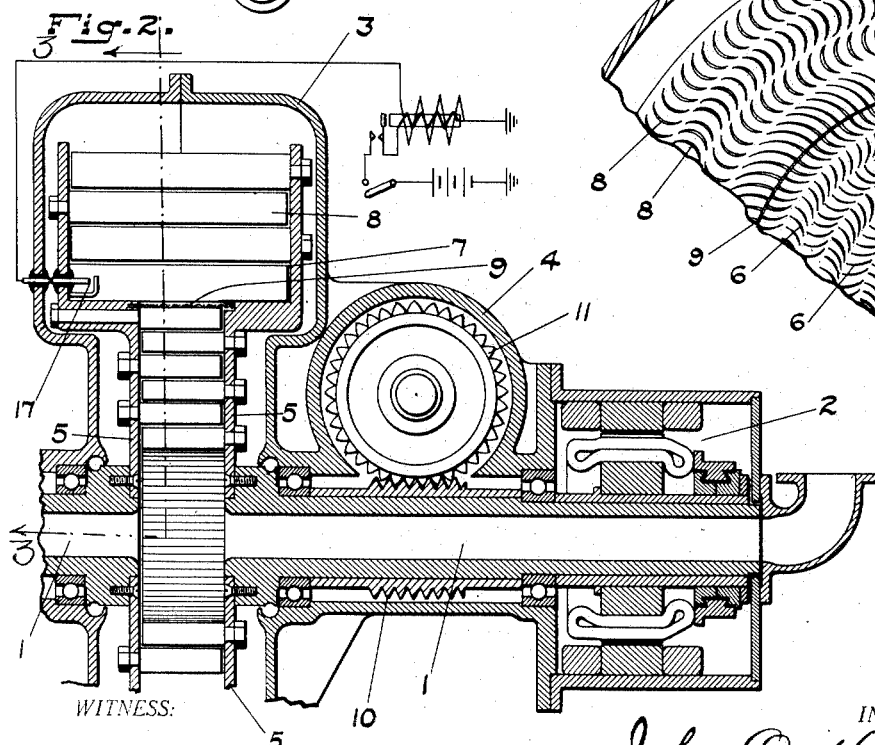

JOHN O. HEINZE, OF BOYNE CITY, MICHIGAN.

TURBINE.

1,388,707. Specification of Letters Patent. Patented Aug. 23, 1921.

Application filed October 1, 1918, Serial No. 256,449. Renewed January 7, 1921. Serial No. 435,756.

*To all whom it may concern:*

Be it known that I, JOHN O. HEINZE, a citizen of the United States, residing at Boyne City, Charlevoix county, and State of Michigan, have invented and discovered certain new and useful Improvements in Turbine-Engines, of which the following is a specification.

My invention relates to turbine engines, and particularly to improvements on the type of engine shown in my application for Letters Patent filed November 4, 1916.

The object of the present invention is to increase the rapidity of expansion of the gaseous power medium and prevent choking of the propeller elements of the turbine.

With the above object in view, my invention is embodied in preferable form in the construction and arrangement hereinafter described and illustrated in the accompanying drawings.

In these drawings, Figure 1 is a plan view partly in section of the engine and driven mechanism; Fig. 2, a central vertical section having one end broken away, and Fig. 3, a detail section on line 3—3 of Fig. 2.

Referring to the drawings, 1 indicates a two-part central hollow shaft constituting the driving shaft of the engine and also a conduit for conveying axially a combustible gaseous mixture to the engine. On the outer end of each section of this shaft is mounted a dynamo electric machine 2 adapted to operate as a motor or as a generator, so as to thereby either start the engine or to be driven thereby and thus generate current for any purpose. The shafts revolve within a fixed cover of two hemispherical shell sections 3, joined by a suitable flange. This cover is fixed to a supporting body or case 4 in which the shafts 1 are journaled. Fixed on the inner end of each shaft is a disk 5. These disks are adapted to drive or be driven in opposite directions and each constitutes a rotor member. These disks are mounted with their faces adjacent and opposing one another and they form a circular casing which is fluid tight axially and open at its periphery. Extending axially and inwardly from the face of each disk is a series of suction and compression blades 6, which blades have a form substantially the same as that of the well known "Sirocco" pressure fan elements and the curve of their cross sections and the angle of their connection to the face of the disks are such that they will act to draw in the gaseous fluid from the hollow shaft conduits and compress the same within the supply chamber in the inner circular portion of the casing surrounding the points of admission of the fluid. The corresponding and interacting compression blades of the two oppositely rotating disks are disposed with their faces in opposite positions in order to correspond with the directions of rotation of said disks. Each disk is provided with a number of concentric series or steps of these blades and in the drawing each disk is shown as having three of such sets, but a greater or less number may be provided, if desired.

Beyond the series of suction and compression blades, the disks are enlarged axially to form an enlarged expansion chamber 7 which preferably has a cubical capacity substantially three times as great as that of the inner chamber in which the suction and compression blades are located.

In this outer enlarged concentric circular portion of the disk casing are mounted interactive pressure receiving or pressure imparting elements consisting of propeller turbine blades 8 which in the particular embodiment illustrated in the drawings are preferably of the form of blades employed in the well known Parsons turbine. Each disk is provided with several concentric series or steps of these propeller blades and the respective blades of the two disks are curved oppositely to accord with the directions of rotation of said disks. These propeller blades are also adapted to overlap with the blades of the respective steps projecting alternately from the two disks.

Between the blades of the inner series which constitute the gas feeding and compression members and the outer series which constitute the propeller members is mounted a wire guard screen 9 which is adapted to prevent a back flame from the space occupied by the propeller blades of the disks. This screen thus divides the casing formed by the two fluid tight disks into an outer expansion and combustion chamber and an inner compression and supply chamber.

The blades of the two adjacent concentric rows of the compressor elements and propeller elements have the tangents to their curves at less acute angles to one another than those of the other elements whereby an easy and comparatively direct feed of the gas is effected from the supply chamber to the combustion chamber.

Carried by each hollow shaft 1 is a driving screw 10 adapted to engage a worm 11 carried at the upper end of a connecting shaft 12, each carrying a driving gear 14 carried by a fly wheel or clutch 15 mounted on a shaft 16 which connects with the object to be driven. A spark plug 17 provides the initial ignition for the combustible gaseous mixture in the combustion chamber. After the turbine has become started, continuous combustion is maintained by the flame of the gases. An exhaust opening 18 leads from the periphery of the casing through which the spent fluid escapes.

In the operation of the engine, each rotor carrying shaft 1 is started by its individual electric motor 2, by throwing on switches controlling the circuit through said motors and battery, thereupon the two rotors will be driven in opposite directions and as they rotate the opposite suction elements 6 on the two members will draw a combustible gaseous mixture through the hollow shafts into the common inlet chamber and casing, and the explosive mixture will be compressed to the proper degree to obtain effective explosion. The explosive mixture is forced outwardly toward the periphery of the device through the wire guard screen 9 into the combustion chamber where it is ignited initially by the spark of the plug, and then continuously thereafter by the flame in the combustion chamber. As the gas expands it exerts an equal active and reactive pressure against a pair of overlapping blades 8 carried by the respective rotors, and as both rotors are freely movable both are rotated by such expansive pressure and the shafts 1 are thereby driven. The enlarged outer chamber 7 permits of the free expansion of the gases and prevents choking of the same within the engine and enables the full energy of the gases to be utilized.

Having thus described my invention, what I claim is:—

1. A turbine engine having opposed rotor disks, and having an inner compression and suction chamber, and an outer concentric expansion and combustion chamber of greater area than the first chamber.

2. In a turbine engine, in combination with oppositely rotating disks, rotors, hollow conduit shafts for said disks for feeding the explosive mixture axially thereto, and inner circular series of suction and compression elements, an outer series of propeller elements, and a combustion and expansion chamber enlarged axially to a greater area than the suction and compression space.

3. A turbine engine for explosive mixtures comprising opposing disks rotatable in opposite directions, an inner compression chamber, said disks having a series of interactive elements, a hollow fuel conveying shaft for each disk which said elements surround, outer concentric series of propulsion elements, a screen separating the two sets of elements, said disks being widened axially from the junction between the two sets of elements to the peripheries of the disk to provide a combustion and expansion chamber of greater area than the compression chamber occupied by the first elements.

In witness whereof, I have hereunto set my hand and seal at Boyne City this 3d day of September, A. D. nineteen hundred and eighteen.

JOHN O. HEINZE. [L. S.]

Witnesses:
  E. A. RUEGSEGGER,
  MILDRED JONES.